United States Patent
Cao

(10) Patent No.: US 7,917,809 B2
(45) Date of Patent: Mar. 29, 2011

(54) BIOS TEST SYSTEM AND TEST METHOD THEREOF

(75) Inventor: Xiang Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 292 days.

(21) Appl. No.: 12/192,089

(22) Filed: Aug. 14, 2008

(65) Prior Publication Data
US 2009/0313504 A1 Dec. 17, 2009

(30) Foreign Application Priority Data
Jun. 13, 2008 (CN) .......................... 2008 1 0302138

(51) Int. Cl.
*G06F 11/00* (2006.01)
(52) U.S. Cl. ................. 714/32; 714/28; 714/37; 714/38
(58) Field of Classification Search ............ 714/25, 714/28, 30, 31, 32, 33, 37, 38, 39, 40, 47
See application file for complete search history.

(56) References Cited

U.S. PATENT DOCUMENTS

| | | | | | |
|---|---|---|---|---|---|
| 5,157,782 | A | * | 10/1992 | Tuttle et al. | 714/45 |
| 5,850,562 | A | * | 12/1998 | Crump et al. | 714/31 |
| 2004/0024840 | A1 | * | 2/2004 | Levine et al. | 709/217 |
| 2005/0039081 | A1 | * | 2/2005 | Chang et al. | 714/36 |
| 2007/0018653 | A1 | * | 1/2007 | Choi | 324/500 |
| 2008/0122659 | A1 | * | 5/2008 | Hou et al. | 341/22 |
| 2009/0265580 | A1 | * | 10/2009 | Lee et al. | 714/27 |

FOREIGN PATENT DOCUMENTS
CN 1797357 A 7/2006
* cited by examiner

*Primary Examiner* — Robert Beausoliel
*Assistant Examiner* — Joseph D Manoskey
(74) *Attorney, Agent, or Firm* — Zhigang Ma

(57) ABSTRACT

A basic input output system (BIOS) test system includes a protocol conversion module and a computer. The protocol conversion module is connected to a tested device. The computer is connected to the protocol conversion module. The computer controls the protocol conversion module to simulate a keyboard to send keyboard commands to the device. The computer storing correct setting lists and comments of the setting lists of the BIOS. The tested device selects setting lists and comments thereof according to the keyboard selection commands sent by the protocol conversion module. The tested device is connected to the computer to deliver selected setting lists and comments thereof to the computer. The computer compares the selected setting lists and comments thereof with the correct setting lists.

7 Claims, 2 Drawing Sheets

BIOS TEST SYSTEM AND TEST METHOD THEREOF

BACKGROUND

1. Field of the Invention

The present invention relates to a basic input output system (BIOS) test system and test method thereof.

2. Description of Related Art

BIOS is important to a computer. The version of the BIOS may be changed frequently. Therefore testing the BIOS is very important. The testing involves checking setting lists of the BIOS and comments of the setting lists. Generally, the test method is performed manually, and thus burdensome and time-consuming.

What are needed, therefore, are a BIOS test system and a method thereof to simplify the testing and shorten the test time.

DETAILED DESCRIPTION

Figure 1:
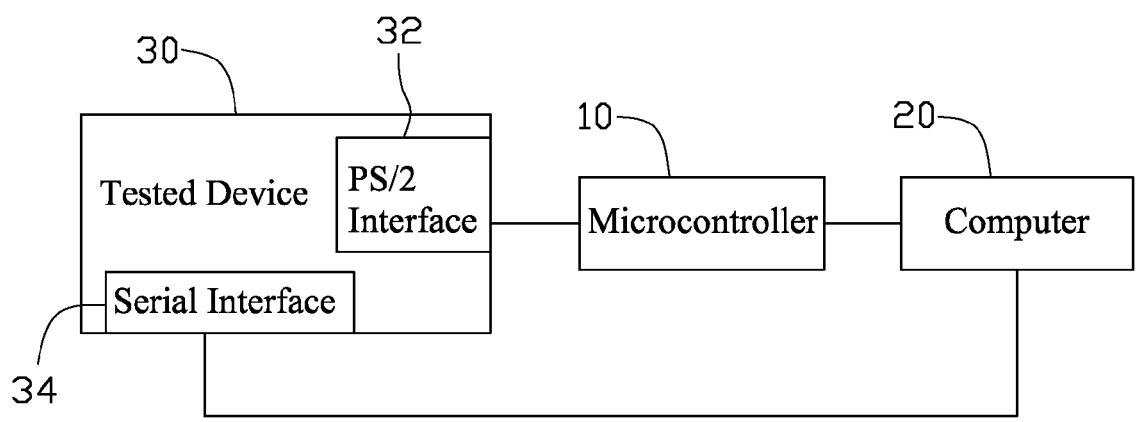
FIG. 1 is a block diagram of a BIOS test system in accordance with an embodiment of the present invention.

Referring to FIG. 1, a BIOS test system according to an embodiment of the present invention includes a microcontroller 10 as a protocol conversion module, and a computer 20.

The BIOS test system is configured to test whether a BIOS of a device 30 is correct. The microcontroller 10 is connected to the device 30 via a PS/2 interface 32 of the device 30. The computer 20 is connected to the microcontroller 10 to control the microcontroller 10 to simulate keyboard selection commands. The device 30 selects setting lists of the BIOS and comments of the setting lists according to selection commands sent by the microcontroller 10. The device 30 is connected to the computer 20 via a serial interface 34 of the device 30. The device 30 delivers selected setting lists and corresponding comments thereof to the computer 20. The computer 20 checks if the setting lists and corresponding comments are the same as the correct setting lists and comments.

Figure 2:
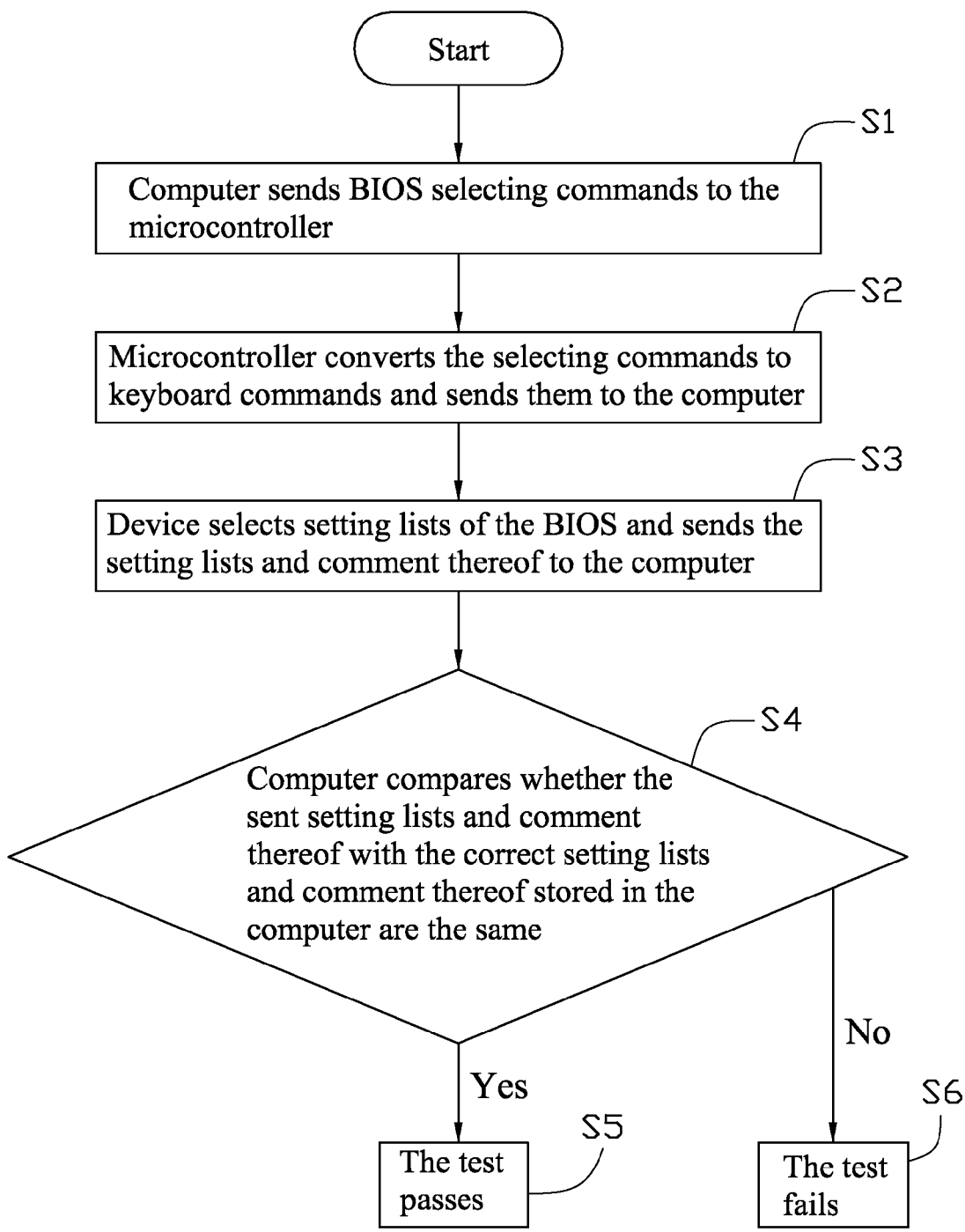
FIG. 2 is a flowchart of a BIOS test method in accordance with another embodiment of the present invention applied to the BIOS test system of FIG. 1.

Referring to FIG. 2, the BIOS test method applied to the BIOS test system, in accordance with another embodiment, utilizes the microcontroller 10 to simulate keyboard commands to test the BIOS. The BIOS test method includes the following steps:

Step 1, the computer 20 sends BIOS selection commands to the microcontroller 10;

Step 2, the microcontroller 10 converts the selection commands to keyboard commands and sends them to the device 30;

Step 3, the device 30 selects setting lists of BIOS and comments of the setting lists one by one and sends them to the computer 20;

Step 4, the computer 20 compares whether the sent setting lists of the BIOS and comments of the setting lists with the correct setting lists and comments thereof stored in the computer 20 and determines whether they are the same;

Step 5, upon a condition that the comparison result is the same, the computer 20 displays an indication that the BIOS is correct;

Step 6, upon a condition that the comparison result is different, the computer 20 displays an indication that the BIOS is faulty.

In other embodiments, other chips capable of converting signals between the keyboard interface protocol and the serial interface protocol can replace the microcontroller 10. The microcontroller 10 can simulate keyboards commands for use with other interfaces such as a universal serial bus (USB) interface.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A basic input output system (BIOS) test system, comprising:
a protocol conversion module connected to a device comprising a BIOS, and
a computer connected to the protocol conversion module to control the protocol conversion module to simulate keyboard selection commands to the device, the computer storing correct setting lists and comments of the setting lists of the BIOS;
wherein the device selects setting lists of the BIOS and comments of the setting lists according to the keyboard selection commands sent by the protocol conversion module, the device is connected to the computer to deliver selected setting lists and comments thereof to the computer, the computer checks if the setting lists and comments are the same as the correct setting lists and comments.

2. The BIOS test system as claimed in claim 1, wherein the protocol conversion module is a microcontroller.

3. The BIOS test system as claimed in claim 1, wherein the protocol conversion module is connected to the device via a PS/2 interface of the device being tested.

4. The BIOS test system as claimed in claim 1, wherein the protocol conversion module is connected to the device via a serial interface of the device being tested.

5. A BIOS test method apply to the BIOS test system as claimed in claim 1, comprising the following steps:
providing the computer to send BIOS selection commands;
providing the protocol conversion module to receive the BIOS selection commands and convert the BIOS selection commands to the keyboard selection commands;
providing the device to receive the keyboard selection commands and select the setting lists and comments thereof according to the keyboard selection commands and deliver them to the computer;
using the computer to check if the setting lists and comments are the same as the correct setting lists and comments;
upon a condition that the comparison result is the same, using the computer to output an indication that the BIOS is correct; and
upon a condition that the comparison result is the different, using the computer to output an indication that the BIOS is faulty.

6. The method as claimed in claim 5, wherein the computer output the test pass or fault via a monitor.

7. The method as claimed in claim 5, wherein the protocol conversion module is a microcontroller.

\* \* \* \* \*